United States Patent
Singh et al.

(10) Patent No.: US 11,784,954 B2
(45) Date of Patent: *Oct. 10, 2023

(54) PERSONALIZED TEMPORARY UNSUBSCRIBE MECHANISMS FOR EMAIL SUBSCRIPTIONS

(71) Applicant: Adobe Inc., San Jose, CA (US)

(72) Inventors: Vishnu Singh, Uttar Pradesh (IN); Ram Bhushan Agrawal, Uttar Pradesh (IN); Medha Kumari, Bihar (IN); Deepansh Rawal, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,742

(22) Filed: Feb. 15, 2023

(65) Prior Publication Data
US 2023/0198927 A1    Jun. 22, 2023

Related U.S. Application Data

(63) Continuation of application No. 17/519,751, filed on Nov. 5, 2021, now Pat. No. 11,616,746.

(51) Int. Cl.
*H04L 51/212* (2022.01)
*H04L 51/18* (2022.01)
*H04L 51/214* (2022.01)

(52) U.S. Cl.
CPC ............ *H04L 51/212* (2022.05); *H04L 51/18* (2013.01); *H04L 51/214* (2022.05)

(58) Field of Classification Search
CPC ..... H04L 51/212; H04L 51/18; H04L 51/214; G06Q 10/10; G06Q 10/107; G06Q 30/0251; G06Q 30/0264; G06Q 30/0272
See application file for complete search history.

(56) References Cited

U.S. PATENT DOCUMENTS 5,864,684 A * 1/1999 Nielsen ................ G06Q 10/107
                                                            709/240
9,773,257 B1 * 9/2017 Bodell ............... G06Q 30/0251
(Continued)

OTHER PUBLICATIONS

U.S. Appl. No. 17/519,751, "Notice of Allowance", dated Nov. 23, 2022, 24 pages.
(Continued)

*Primary Examiner* — Johnny B Aguiar
(74) *Attorney, Agent, or Firm* — Kilpatrick Townsend & Stockton LLP

(57) ABSTRACT

In some embodiments, techniques for generating personalized unsubscribe options for emails are provided. For example, a subscription management system can access information associated with an active email subscription and a user profile for a user. The subscription management system can determine a temporary unsubscribe time period for the user based on the information associated with the active email subscription and the profile of the user. The subscription management system can embed a temporary unsubscribe option in an email to be sent to the user. The temporary unsubscribe option can represent the temporary unsubscribe time period. The subscription management system can cause the email to be sent to the user and receiving a selection of the temporary unsubscribe option indicating the temporary unsubscribe time period. The subscription management system can change the active email subscription to a suppressed email subscription associated with the temporary unsubscribe time period.

20 Claims, 7 Drawing Sheets

(56) References Cited

U.S. PATENT DOCUMENTS

| | | | | |
|---|---|---|---|---|
| 2003/0233413 A1* | 12/2003 | Becker | ................ | G06Q 10/107 |
| | | | | 709/206 |
| 2011/0078308 A1* | 3/2011 | Bardsley | ................ | H04L 51/00 |
| | | | | 709/224 |
| 2013/0191467 A1* | 7/2013 | Dernavich | ......... | G06Q 30/0251 |
| | | | | 709/206 |
| 2017/0017971 A1* | 1/2017 | Moreau | .............. | G06Q 30/0202 |
| 2018/0314761 A1* | 11/2018 | Lewin-Eytan | ...... | G06F 16/9535 |
| 2021/0385181 A1* | 12/2021 | Parkinson | ............ | G06Q 10/107 |

OTHER PUBLICATIONS

Habib et al., ""It's a Scavenger Hunt": Usability of Websites' Opt-Out and Data Deletion Choices", Chi 2020 Proceedings of the 2020 CHI Conference on Human Factors in Computing Systems, Apr. 25-30, 2020, pp. 1-12.

* cited by examiner

PERSONALIZED TEMPORARY UNSUBSCRIBE MECHANISMS FOR EMAIL SUBSCRIPTIONS

CROSS-REFERENCE TO RELATED APPLICATIONS

This application is a Continuation of U.S. application Ser. No. 17/519,751, filed Nov. 5, 2021, the content of which is incorporated herein by reference.

TECHNICAL FIELD

This disclosure relates generally to email subscription management. More specifically, but not by way of limitation, this disclosure relates to providing personalized unsubscribe options for users to temporarily suppress email subscriptions.

BACKGROUND

An "unsubscribe" request or command is a way for email users (subscribers) to inform email senders that they do not want to receive their emails in the future. However, existing unsubscribe mechanisms result in a complete removal of email users from the sender's subscription list. As a result, a user who unsubscribes from an email subscription will no longer receive emails from the subscription service even if the user later changes his or her mind. The user will have to perform various searches or other operations to find a way to re-subscribe to the email list. For the email senders, removing unsubscribed email users from the subscription list may not necessarily lead to the removal of the email users from the system. If the user later re-subscribes to the email, duplicate or redundant records for the same user may be created, resulting in the consumption of more storage space than necessary.

SUMMARY

Certain embodiments involve providing personalized unsubscribe options for users to temporarily suppress email subscriptions. In one example, a subscription management system accesses information associated with an active email subscription by a user and a profile of the user and determines a temporary unsubscribe time period for the user based on a set of factors determined from the information associated with the active email subscription and the profile of the user. The set of factors include two or more of: information contained in emails sent to the user under the active email subscription, an open rate of the emails sent to the user under the active email subscription, a click rate of the emails sent to the user under the active email subscription, a preference of the user determined based on the profile of the user, or past actions taken by the user with respect to items described in the emails sent to the user under the active email subscription.

The subscription management system embeds, in an email to be sent to the user, multiple unsubscribe options that represent respective unsubscribe time periods including the temporary unsubscribe time period. After the email is sent to the user, the subscription management system may receive a selection among the multiple unsubscribe options indicating a selected unsubscribe time period. The subscription management system changes the active email subscription to a suppressed email subscription associated with the selected unsubscribe time period. Prior to the selected unsubscribe time period expires, the subscription management system determines an updated temporary unsubscribe time period for the user based on the suppressed email subscription and the profile of the user. The subscription management system embeds a set of unsubscribe options in a reminder email to be sent to the user, including an unsubscribe option representing the updated temporary unsubscribe time period.

If the subscription management system receives a selection of the unsubscribe option representing the updated temporary unsubscribe time period from the reminder email, the subscription management system extends the suppressed email subscription by the updated temporary unsubscribe time period. If the subscription management system does not receive any selection among the set of unsubscribe options prior to the initial unsubscribe time period expires, the subscription management system changes the suppressed email subscription back to the active email subscription and sends subscribed emails to the user based on the active email subscription.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
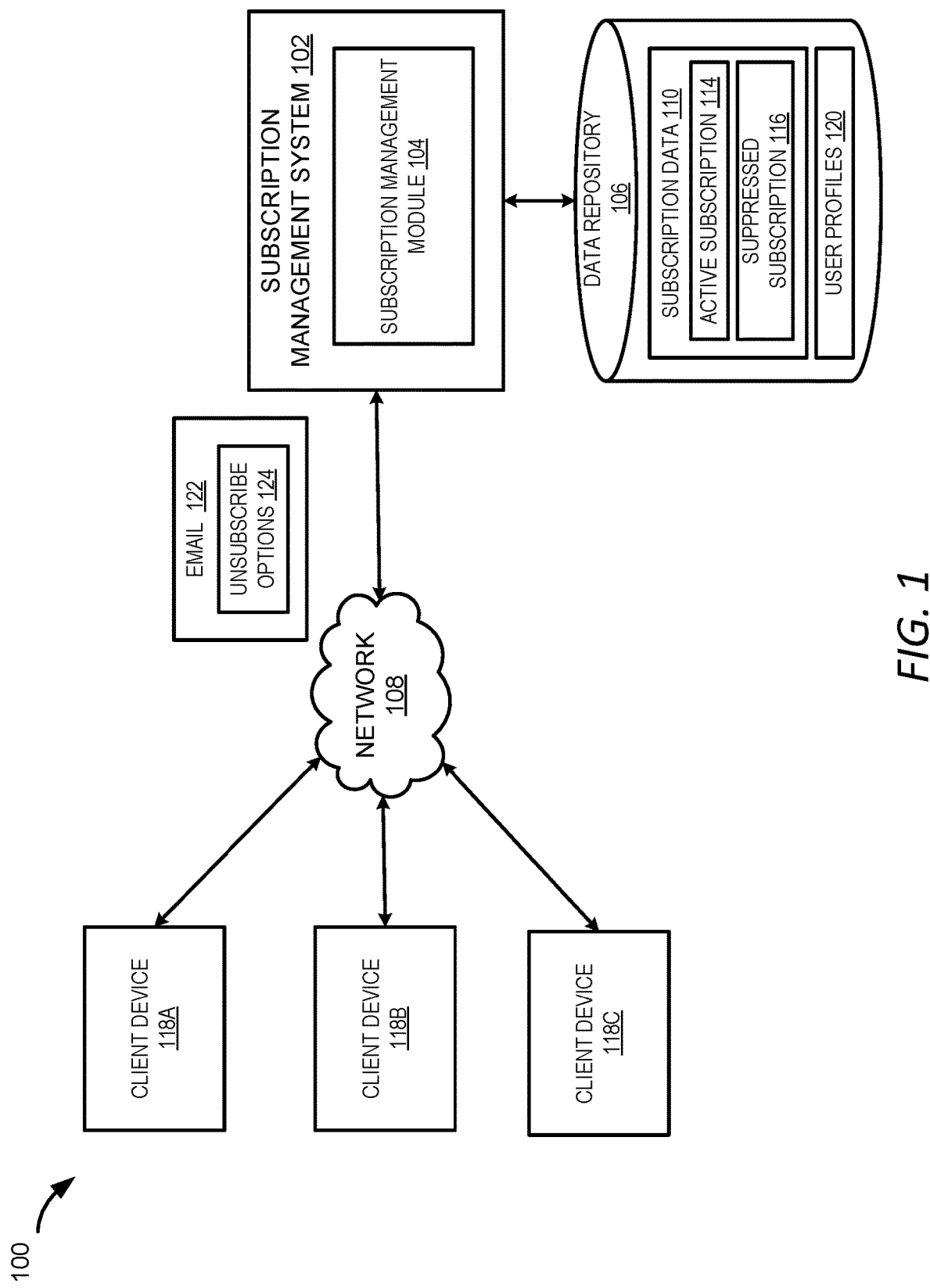
FIG. 1 depicts an example of a computing environment in which a subscription management system can be used to provide personalized unsubscribe options for users to temporarily suppress email subscriptions, according to certain embodiments of the present disclosure.

Certain embodiments involve providing personalized unsubscribe options for users to temporarily suppress email subscriptions. For instance, a subscription management system determines, for a user with an active email subscription, one or more personalized unsubscribe options based on information such as the profile of the user. The subscription management system embeds the personalized unsubscribe options in an email sent to the user. Upon receiving a selection among the unsubscribe options, the subscription management system changes the active subscription to a suppressed subscription for a time period specified in the selection.

The following non-limiting example is provided to introduce certain embodiments. In this example, a subscription management system is configured to determine personalized unsubscribe options for users to temporarily suppress email subscriptions. The subscription management system identifies an active subscription of a user and accesses the data associated with the subscription, such as the type of content included in the emails. The subscription management system further accesses a profile of the user that contains various information about the user such as the demographic data and activity data of the user.

Based on the information associated with the active email subscription and the user profile, the subscription management system estimates one or more time periods to temporarily suppress the subscription. For example, for subscriptions involving real estate content, the temporary unsubscribe period can be estimated to be longer than subscriptions for content involving electronic devices. The subscription management system can estimate the temporary unsubscribe time period using estimation functions over the various attributes or factors discussed above. Alternatively, or additionally, the subscription management system can estimate the time period using a machine learning model. The training dataset of the machine learning model can be collected based on user selections generated using the estimation functions. As more user selections are received, the training dataset is updated and used to update the machine learning model to achieve a better prediction accuracy.

The subscription management system embeds the temporary unsubscribe options in an email to be sent to the user. The embedding can be performed in the email body or in the email header. For example, the subscription management system can embed the multiple unsubscribe options as separate Uniform Resource Locator (URL) links, with one link corresponding to one unsubscribe option. Each of the links is configured such that when the user clicks on one of the links in the email body, the subscription management system receives a notification for the selected unsubscribe option. The subscription management system then moves the user to the suppressed subscription list along with an indication of the associated temporary unsubscribe time period.

In another example, the subscription management system embeds the temporary unsubscribe options in the email body or the email header as a single URL link that contains the multiple unsubscribe options. When this single URL link is clicked or otherwise activated by the user, the subscription management system generates a personalized webpage for the user based on the information contained in the URL. Based on the selection of the user in this personalized webpage, the subscription management system moves the user to the suppressed subscription list along with an indication of the associated temporary unsubscribe time period.

For users who are moved to the suppressed subscription list, the subscription management system determines whether the temporary unsubscribe period is close to expiring. When the temporary unsubscribe period is close to expiring, the subscription management system generates a reminder email and calculates one or more updated temporary unsubscribe periods for the user. The subscription management system further embeds the updated temporary unsubscribe options in the reminder email using any mechanism discussed above. The updated temporary unsubscribe options allow the user to extend the temporary unsubscribe period by another time period specified in the unsubscribe options. If the user makes no selection of the unsubscribe options in the reminder email, the subscription emails will resume when the existing temporary unsubscribe period ends.

As described herein, certain embodiments provide improvements to email subscription services by solving problems that are specific to computers and the Internet. Due to the nature of computers and the Internet, sending emails occurs at little to no cost to email senders. Thus, a large number of unwanted emails are spread on the Internet consuming memory and computing resources of senders' and receivers' email servers and consuming network bandwidth. The improvements provided by the embodiments described herein include providing email subscribers the opportunity to temporarily suppress the subscription. Without the temporary unsubscribe options, users who want to maintain an email subscription but temporarily are uninterested in receiving emails from the relevant service must keep the subscription active and receive emails they will not read. The temporary suppression can prevent unnecessary and/or unwanted emails from being sent to the users for user-specified time periods. This not only saves the storage space in the email account of the user, in the email server and the backup server, but also saves the network bandwidth that would be consumed by transmitting the unwanted emails.

In addition, without the temporary unsubscribe options, users must either continue to receive emails that they are not interested in or completely unsubscribe and no longer receive emails from the subscription service. If a user later changes his mind, the user must do various online searching to try to find ways to re-subscribe to the email list. By providing the temporary unsubscribe options, email users can save time and computing resources on searching and re-subscribing to an email list that the user unsubscribed before.

For subscription management systems, providing email subscribers the opportunity to temporarily suppress the subscription can reduce or avoid the automatic creation of duplicate records for the same subscriber if the user unsubscribes and later re-subscribes. This reduces storage space requirements and reduces computing resources needed for searching or indexing the database storing information about the subscriptions and subscribers. For a system managing email subscriptions for tens of millions or even hundreds of millions of subscribers, the reduction of storage and computational resources achieved by embodiments described herein can be significant. Further, because duplicate records are avoided or minimized, the need for running separate software to detect and remove duplicate records in the system is reduced or eliminated, thereby further reducing the computing and memory usage.

As used herein, the term "email subscription" is used to refer to an arrangement for a user (subscriber) to continuously receive emails containing content about a certain topic. For example, an email subscription service may deliver emails containing information associated with an entity and/or a product or service provided by the entity. A product can include, for example, merchandise made or sold by the entity. Services can include news service, media content distribution service, and so on. Emails sent through a subscription service may provide newsletters or updates regarding sales, coupons, special events, etc. Users or subscribers with an "active subscription" continuously receive the emails. Users or subscribers with a "suppressed subscription" do not receive the emails until the subscription becomes active.

As used herein, the term "unsubscribe" is used to refer to a subscriber of an email subscription informing the email sender that he or she does not want to receive the subscribed email in the future. "Temporarily unsubscribe" is used to refer to the subscriber informing the email sender that he or she does not want to receive the subscribed email for a given period of time in the future, such as 3 months, 6 months, a year, and so on. The time period during which the subscriber temporarily unsubscribes is referred to as the "temporary unsubscribe time period" or "unsubscribe time period." Note that "temporarily unsubscribe" and "suppress" are used interchangeably herein.

As used herein, the term "open rate" is used to refer to the ratio between the number of emails that an email subscriber opens and the total number of emails received by the email subscriber. The open rate can be measured for a given period of time during the subscription or the entire subscription time period.

As used herein, the term "click rate" is used to refer to the ratio between the number of emails where an email subscriber clicks or otherwise activates a link contained herein and the total number of emails received by the email subscriber. The click rate can be measured for a given period of time during the subscription or the entire subscription time period.

Referring now to the drawings, FIG. 1 is an example of a computing environment 100 in which a subscription management system 102 can be used to provide personalized unsubscribe options for users to temporarily suppress email subscriptions, according to certain embodiments of the present disclosure. The computing environment 100 also includes multiple client devices 118A-118C (which may be referred to herein individually as a client device 118 or collectively as the client devices 118) communicate with the subscription management system 102 over a network 108. The client devices The network 108 may be a local-area network ("LAN"), a wide-area network ("WAN"), the Internet, or any other networking topology known in the art that connects the client devices 118 to the subscription management system 102. The client device 118 may be any device which is capable of receiving and presenting subscription emails for a user and receiving unsubscribe option selections from the user. For non-limiting examples, client device 118 may be a smart phone, smart wearable, laptop computer, desktop computer, or other type of user device. One or more computing devices are used to implement the subscription management system. For instance, the subscription management system 102 could include a single computing device, a group of servers or other computing devices arranged in a distributed computing architecture, etc.

The subscription management system 102 can determine, for example, through a subscription management module 104, personalized unsubscribe options for users to temporarily suppress email subscriptions. The subscription management system 102 can access a data repository 106 storing user profiles 120 for various users and subscription data 110 associated with these users. For example, the subscription management system 102 accesses the subscription data 110 to identify that a particular user is on an active subscription list 114 rather than a suppressed subscription list 116. The subscription data 110 can also include other data associated with the active subscription list 114, such as the type of content or products and services provided for users in the active subscription list 114. For example, the data include promotional content for international vacation trip packages. Users on the active subscription list 114 may actively and continuously receive subscription emails including the promotional content for international vacation trip packages via their respective client devices 118A-C.

Each user may be associated with a user profile 120. The user profile 120 for a user includes various information about the user. For example, the user profile 120 may include the demographic data of the user, such as age, gender, and race. Other examples of demographic data may include geographical location, parental status, marital status, education history, employment history, income, hobbies, frequently purchased products, home ownership status, political affiliation, religious affiliation, disabilities, nationality, etc. The user profile 120 may also include activity data, such as the actions taken by the user with respect to the subscribed emails. These actions can include opening emails, clicking links in the emails, purchases or other subscriptions, and so on.

In some examples, the user profile 120 may be generated by a service configured to store user data and interactions in a central data storage to create a consistent and comprehensive view of each user. The service is configured to match behaviors and interests to users to generate the user profile 120. The service can also perform tasks such as computations and make decisions based on the user profile 120.

The subscription management system 102, for example using the subscription management module 104, estimates one or more temporary unsubscribe periods for temporarily suppressing the subscription emails for the users. If a user selects a temporary unsubscribe option, the user is moved to a suppressed subscription list 116 along with the selected unsubscribe time period. Users on the suppressed subscription list 116 do not receive subscription emails for the duration of the selected unsubscribe period.

The subscription management system 102 determines the one or more temporary unsubscribe periods using the information associated with user subscriptions and the user profile 120 by using estimation functions or models. In some examples, products that are expensive or purchased infrequently, such as real estate services or vacation packages, may be determined to have longer temporary unsubscribe periods than products that are less expensive or are purchased more frequently, such as electronics or clothing. In other examples, the activity data in the user profile 120 may be used to determine the length of the temporary unsubscribe periods. For example, users that frequently open subscription emails, click on links in subscription emails, purchase products from subscription emails, or utilize promotion codes in subscription emails may have shorter temporary unsubscribe periods. The demographic data (e.g., age, gender, race, etc.) for the user may also be used in determining the temporary unsubscribe periods. For example, younger users have shorter temporary unsubscribe periods for subscription emails related to electronics than older users. Additionally or alternatively, the subscription management system 102 estimates the temporary unsubscribe periods using a machine learning model. The machine learning model can be trained using a training dataset that is based on user selections for temporary unsubscribe periods generated from the estimation functions. The machine learning model may be continuously updated as additional user selections are received to improve the prediction accuracy of the temporary unsubscribe periods. In some examples, the machine learning model can be built by communicating with using a machine learning and artificial intelligence tool that is configured to provide services such as building and training a machine learning model.

In some examples, the subscription management system 102 embeds the temporary unsubscribe periods as unsubscribe options 124 in an email 122 to the user. An example of the unsubscribe options 124 can include a two-month unsubscribe option, a six-month unsubscribe option, and a yearlong unsubscribe option. In some examples, the unsubscribe options 124 may include a permanent unsubscribe option. The unsubscribe options 124 can be embedded in the email body or the email header of the email 122. The subscription management system 102 may send the email 122 to the user by coordinating an email client to communicate with a mail transfer agent for a server domain associated with the subscription emails. The email client can transmit the subscription's email address that is sending the email 122, the user's email address that receives the email 122, and the content of the email 122 including the unsubscribe options 124 to the mail transfer agent. The mail transfer agent can process the user's email address, including the domain of the email address. If the domain of the user's email address is the same as the domain of the subscription's email address, the email 122 may be routed directly to the domain server using a message delivery agent, rather than routing between different servers.

If the domain of the user's email address is not the same as the domain of the subscription's email address, the mail transfer agent can communicate with a mail transfer agent for the user's domain server. The subscription mail transfer agent can identify the user's mail transfer agent by communicating with a domain name server to retrieve the user's domain server. After retrieving the user's domain server, the subscription mail transfer agent can transmit the email 122 to the user's mail transfer agent. The user's mail transfer agent can transmit the email 122 to the user's domain server. The client device 118 can download the email 122 from the user's domain server for display to the user. In some examples, every time a mail transfer agent receives an email 122, the mail transfer agent can add a trace header to the email header, thus building a sequential record of mail transfer agents handling the email 122. If the subscription's domain server is unable to connect with the user's domain server, the email 122 may be transmitted to a queue. A queue agent may periodically resend the email 122 to the user's domain server.

When the email 122 is presented on the client device 118, the user may interact with the client device 118 to select one of the unsubscribe options 124. Based on the selection, the subscription management system 102 updates the subscription data 110 to move the user to the suppressed subscription list 116 along with an indication of the selected temporary unsubscribe period. If the user selects a permanent unsubscribe option, the user is moved to the unsubscribe list forever and no longer receives any further emails.

The subscription management system 102 periodically checks the suppressed subscription list 116 and determines that the temporary unsubscribe period for a user is close to expiring. For example, a temporary unsubscribe period is close to expiring when there is r time period left before the expiration. In some examples, the value of r depends on the length of the temporary unsubscribe period. For example, for a temporary unsubscribe period of 6 months, r can be 2 weeks; for a temporary unsubscribe period of one month, r can be set to 3 days. Alternatively, r can be a set time, such as 2 weeks, regardless of the length of the temporary unsubscribe period. When there is r time period left, the subscription management system 102 calculates one or more updated unsubscribe periods for the user. The updated unsubscribe periods may be the same or different from the original temporary unsubscribe periods. The subscription management system 102 embeds the updated unsubscribe options 124 for the updated unsubscribe periods into a reminder email 122 to send to client device 118 for the user, such as in the email body or header of the reminder email 122 to the user. The user may extend the temporary unsubscribe period by selecting one of the updated unsubscribe options 124 in the reminder email. If the user does not select an updated unsubscribe option 124, subscription emails for the user will resume when the existing temporary unsubscribe period ends and the user is placed back on the active subscription list 114.

Figure 2:
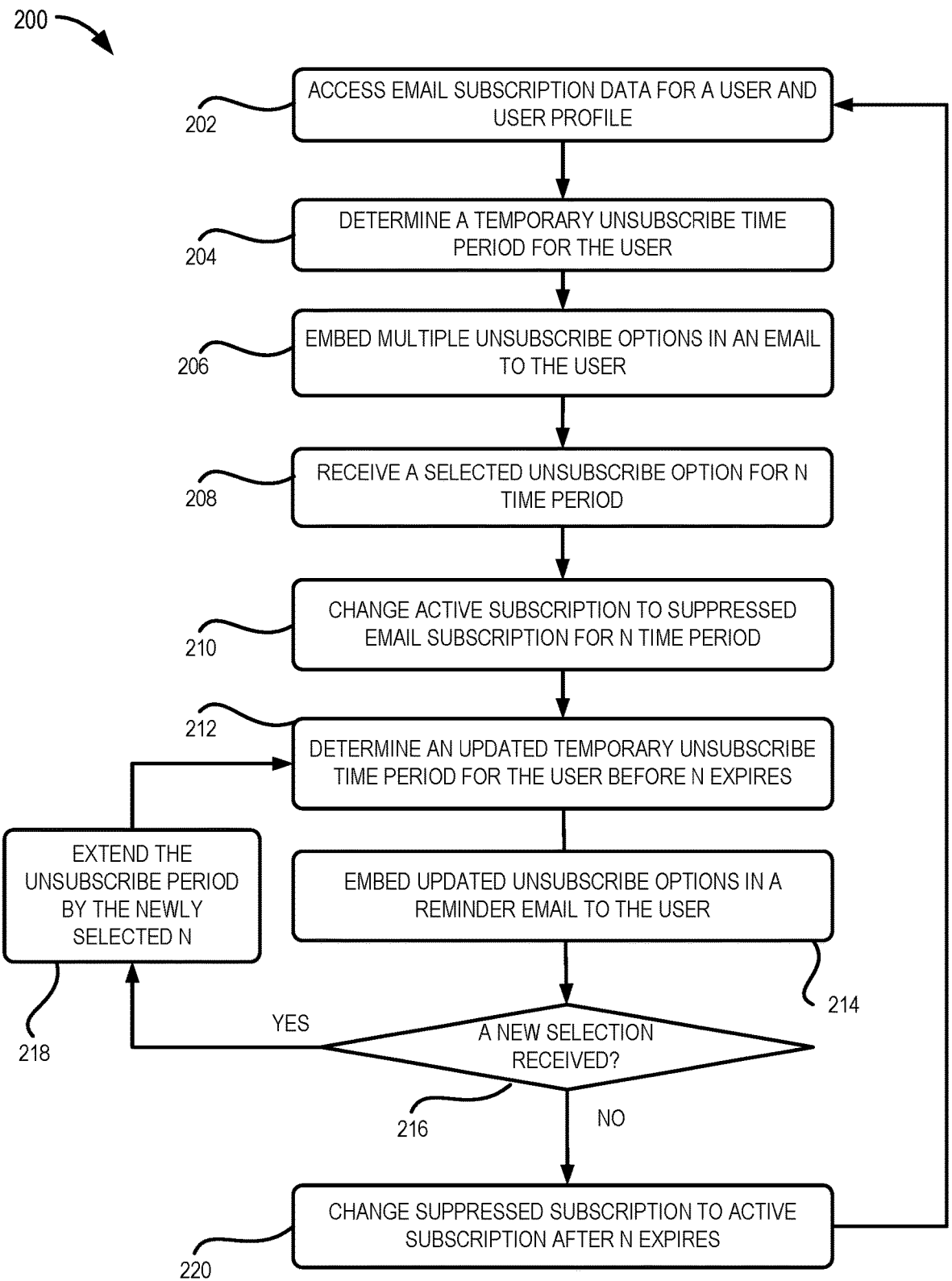
FIG. 2 depicts an example of a process for providing personalized unsubscribe options for users to temporarily suppress email subscriptions, according to certain embodiments of the present disclosure.

FIG. 2 depicts an example of a process 200 for providing personalized unsubscribe options for users to temporarily suppress email subscriptions, according to certain embodiments of the present disclosure. One or more computing devices (e.g., subscription management system 102) implement operations depicted in FIG. 2 by executing suitable program code (e.g., subscription management module 104). For illustrative purposes, the process 200 is described with reference to certain examples depicted in the figures. Other implementations, however, are possible.

At block 202, the process 200 involves accessing, by the subscription management system 102, email subscription data 110 for a user and an associated user profile 120 from the data repository 106. The user may be on the active subscription list 114 and continuously receive subscription emails. The user profile 120 includes demographic data, activity data, and other data associated with the user. At block 204, the process 200 involves determining, by the subscription management system 102, a temporary unsubscribe time period for the user. Block 204 can be used to implement a step for determining a temporary unsubscribe time period for a user based on the information associated with the active email subscription and the profile of the user or a step for determining an updated temporary unsubscribe time period for the user based on the suppressed email subscription and the profile of the user. In some examples, more than one temporary unsubscribe time period may be generated for the user.

In some examples, the subscription management system 102 determines the temporary unsubscribe period using function based calculations. One example of a function based calculation for a temporary unsubscribe period N can be:

$$N = F_1(\text{nature of subscription content}) * F_2(\text{user interest}) * F_3(\text{open/click rate}) * F_4(\text{purchase frequency}) \qquad (1)$$

where each function $F_i(\ )$ is based on the respective input attributes derived from the profile data for the user or data associated with the subscription. For example, $F_1$(nature of subscription content) is a function determining a weight value based on the type of subscription content, such as the service or product provided by the entity offering the subscription. The function outputs a higher weight value for entities that provide expensive or infrequently purchased services or products (e.g., real estate service), as a user may have a less frequent need for the service or product. Higher function outputs correspond to longer temporary unsubscribe periods. $F_2$ (user interest) is a function determining a weight value based on how likely the user is to be interested in or prefers to receive the product or service offered in the subscription emails. The determination is based on demographic data on the user in addition to the type of service or product described in the subscription emails. For example, if the email subscription relates to consumer electronic products, the function outputs a lower weight for users at young age than for older users. $F_3$ (open/click rate) is a function determining a weight value based on how often the user opens the subscription emails or clicks on links in the subscription emails. For example, the function outputs a lower value for users with a high open rate or click rate because the user is deemed to be more interested in receiving the subscription emails. $F_4$ (purchase frequency) is a function determining a weight value based on how often the user purchases services or products relating to the subscription emails. For example, the function outputs a higher value for users that seldom purchase or otherwise act on a service or product associated with the subscription emails. While Eqn. (1) combines the various function $F_i$ outputs through multiplication, other ways to combine these function outputs can be utilized. For example, these outputs can be combined through weighted average, maximum, minimum, median, or any other linear or non-linear combinations.

Additionally, or alternatively, the subscription management system 102 determines the temporary unsubscribe period using a machine learning model, such as a neural network model. The function-based calculations described above can be utilized to build the training data for the machine learning model. For example, user selections of temporary unsubscribe periods that were generated using the function-based calculations can be collected as the training data. As sufficient data is collected, the machine learning model is trained. The trained machine learning model then generates temporary unsubscribe periods. The trained machine learning model may continue to be updated over time as more user selections of model-determined or function-determined temporary unsubscribe periods from a variety of users are received from the client devices 118. Thus, the prediction accuracy of the temporary unsubscribe periods generated by the trained machine learning model may improve over time.

Figure 3:
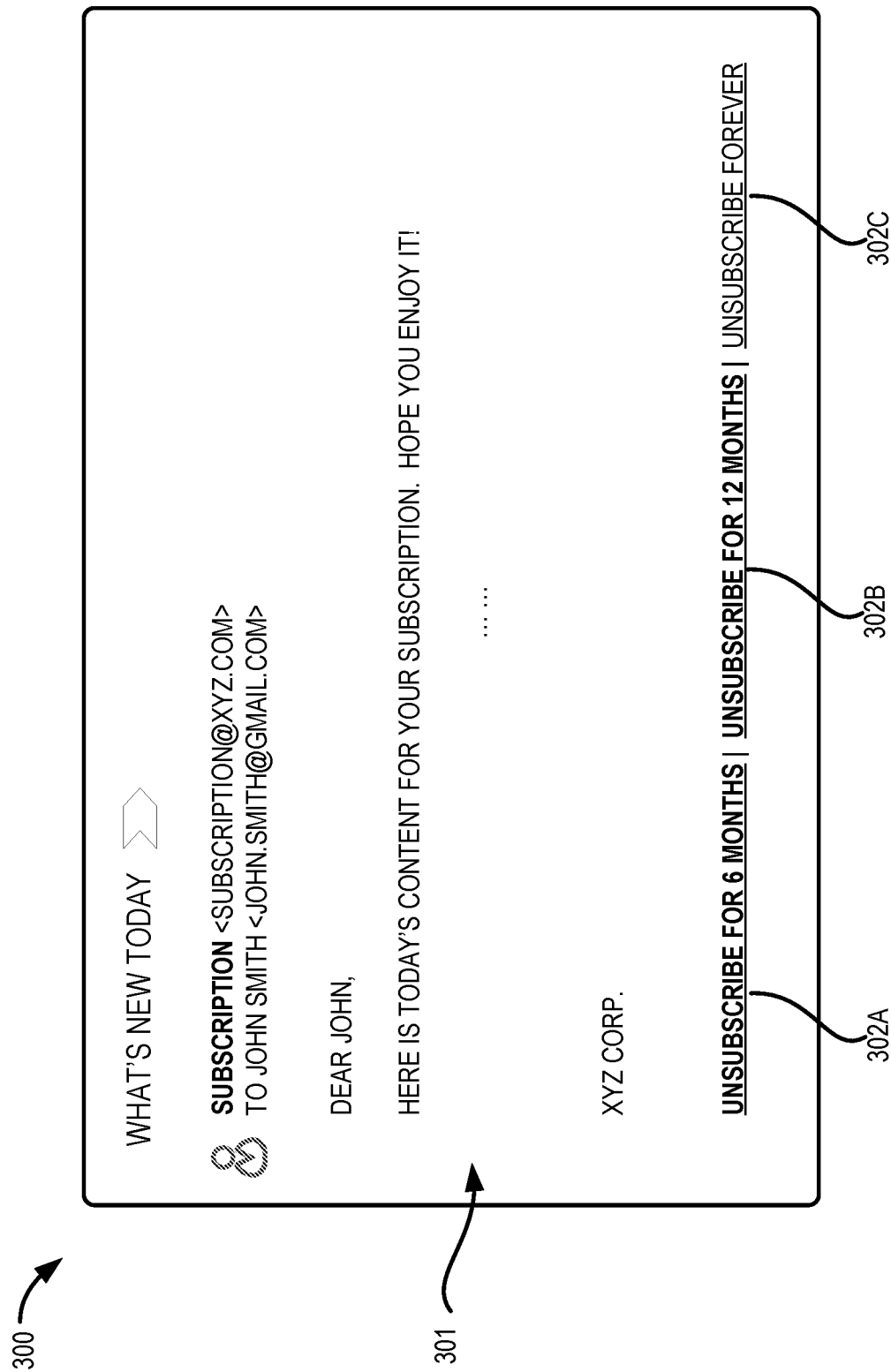
FIG. 3 depicts an example of an email that includes the personalized unsubscribe options, according to certain embodiments of the present disclosure.

At block 206, the process 200 involves embedding, by the subscription management system 102, multiple unsubscribe options 124 in an email 122 to the user, such as an email sent under the subscription. Block 206 can be used to implement a step for embedding multiple unsubscribe options in an email to be sent to the user or a step for embedding a set of unsubscribe options in a reminder email to be sent to the user. In some examples, the unsubscribe options 124 is embedded in the email body. An example of embedding the multiple unsubscribe options 124 in an email body is shown in FIG. 3. In this example, the unsubscribe options 124 include an unsubscribe-for-6-months option 302A, an unsubscribe-for-12-months option 302B, and an unsubscribe-forever option 302C that are embedded in the email body 301 of an email 300. Each unsubscribe option 302A-C is embedded as a separate URL link, with one link corresponding to one unsubscribe option 302. A user may select the URL link associated with their desired unsubscribe option.

Figure 4:
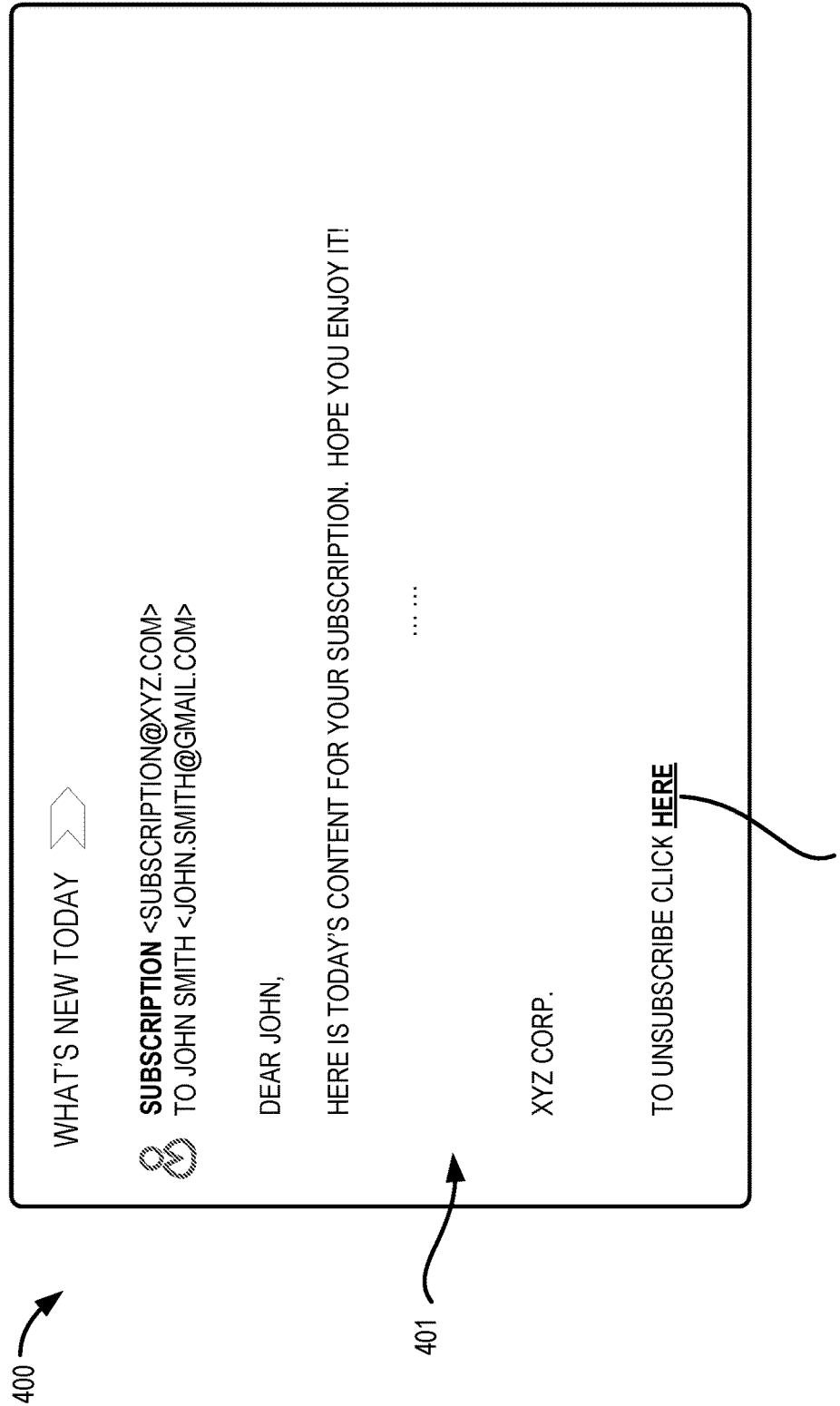
FIG. 4 depicts another example of an email that includes the personalized unsubscribe options, according to certain embodiments of the present disclosure.
Figure 5:
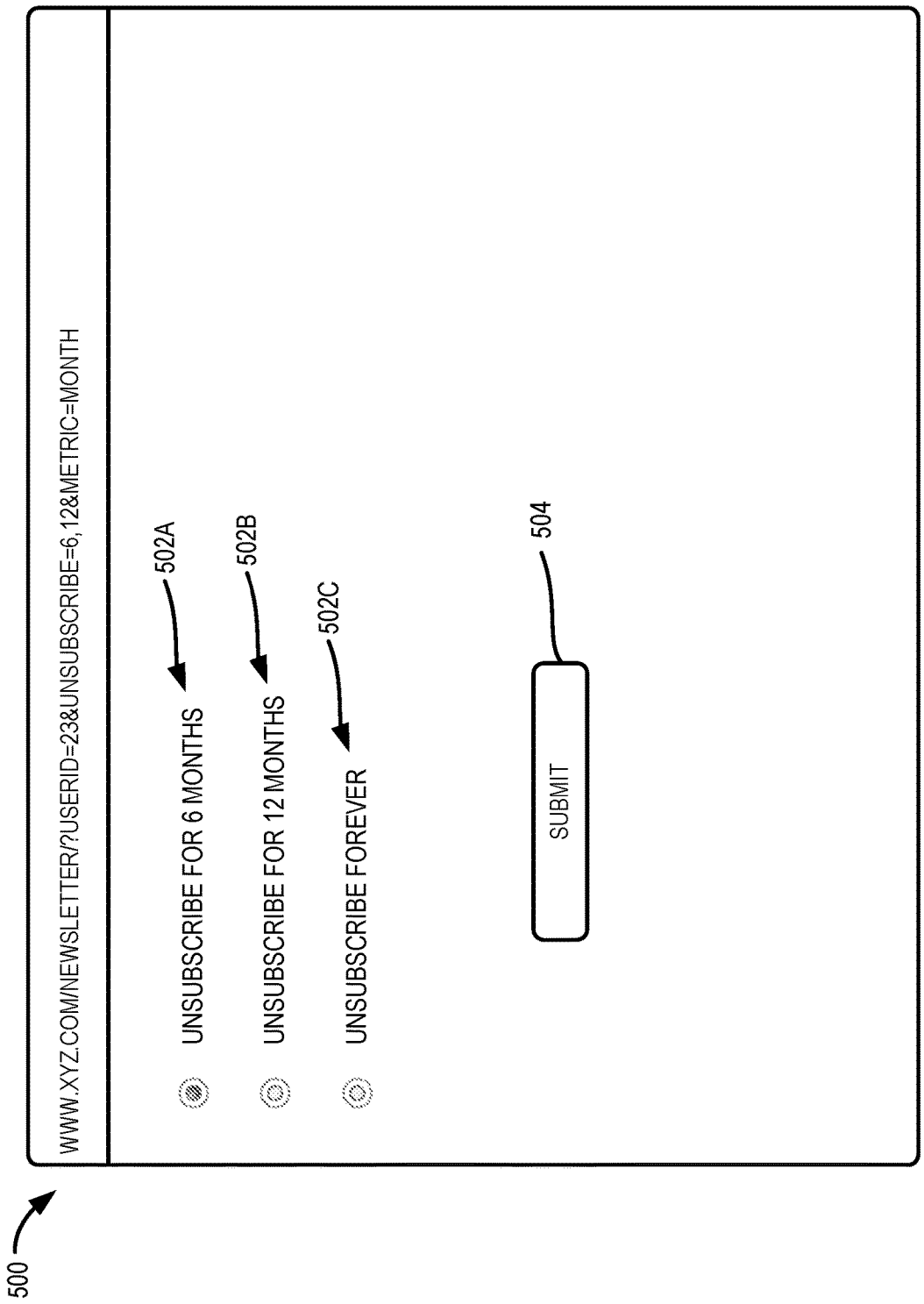
FIG. 5 depicts an example of a webpage providing multiple personalized unsubscribe options, according to certain embodiments of the present disclosure.
Figure 6:
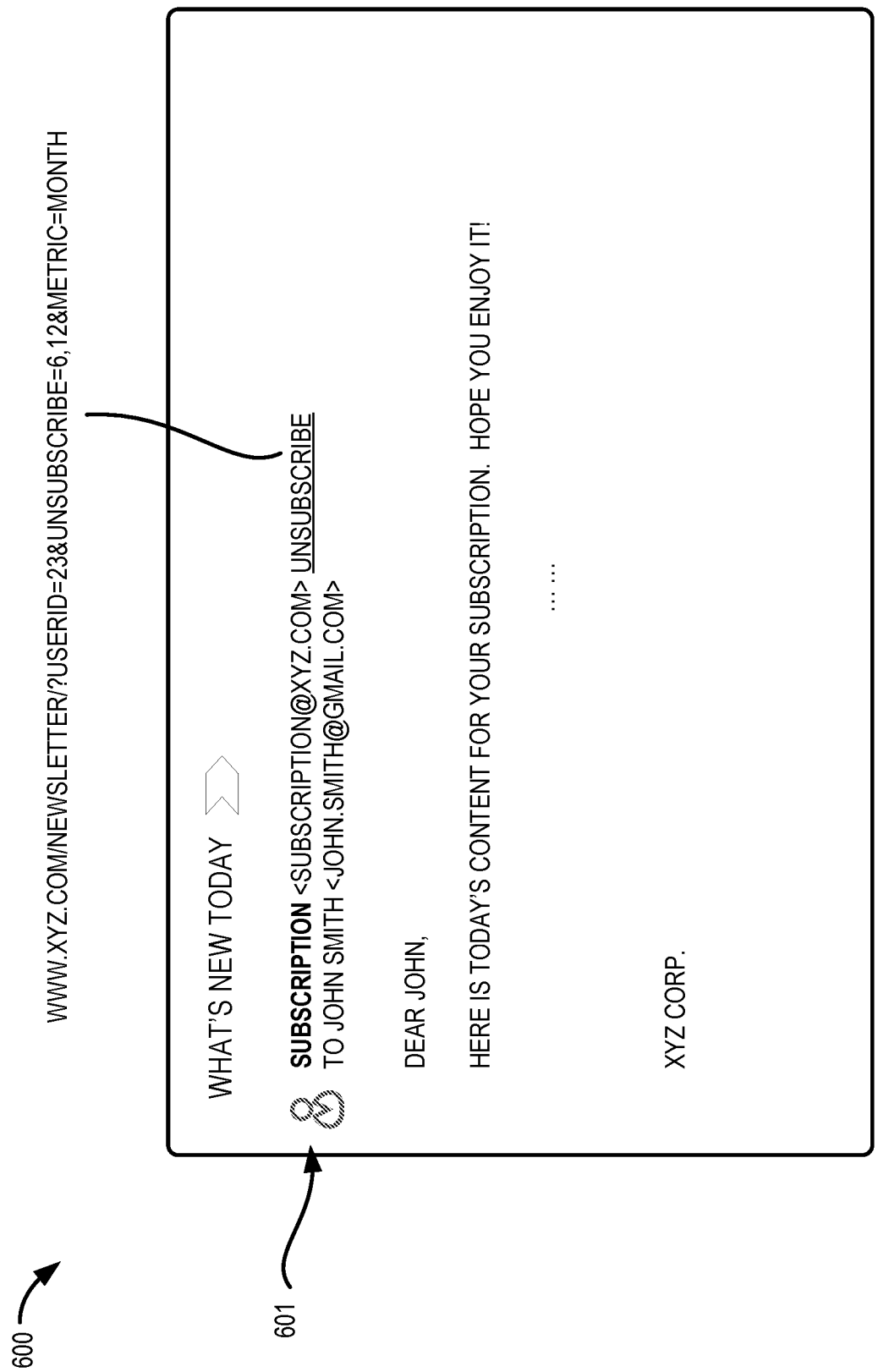
FIG. 6 depicts yet another example of an email that includes the personalized unsubscribe options, according to certain embodiments of the present disclosure.

In another example, the subscription management system 102 embeds the unsubscribe options 124 into an email body of an email 122 as a single URL link, as depicted in FIG. 4. For example, the email body 401 of the email 400 includes the single URL link "www.xyz.com/newsletter/?userid=23&unsubscribe=6,12&metric=month" that specifies that the unsubscribe options 124 for the user with the user ID 23 include 6 months and 12 months. In some examples, the unsubscribe options 124 additionally include an unsubscribe-forever option. When the single URL link is clicked or otherwise activated by the user, the subscription management system 102 generates a personalized webpage, such as the webpage 500 depicted in FIG. 5, for the user based on the information contained in the URL. The subscription management system 102 extracts the unsubscribe options 124 from the URL link, such as the unsubscribe-for-6-months option 502A and the unsubscribe-for-12-months option 502B from the above example, to be displayed as options on the webpage 500. Additionally, the subscription management system 102 displays an unsubscribe-forever option 502C on the webpage 500. The webpage 500 includes a submit button 504 for the user to submit an unsubscribe option 502 after selection. Alternatively or additionally, the subscription management system 102 embeds the single URL link containing the unsubscribe options 124 in an email header of the email by setting a list-unsubscribe header. The Internet Service Provider (ISP) handing the email service for the user parses the email header to identify the list-unsubscribe header. The ISP further renders the URL link in the list-unsubscribe header next to the sender information when displaying the email to the user. When the user clicks on the link, the subscription management system generates the personalized webpage as described above to allow the user to select the unsubscribe option. FIG. 6 shows an example of an email whose header has the URL link containing the multiple unsubscribe options and being presented next to the sender information 601. Clicking on the URL link near the sender information 601 causes a personalized webpage to be generated, such as the webpage 500 shown in FIG. 5, in the same manner as described above.

At block 208, the process 200 involves receiving, from a client device 118 associated with the user, a selected unsubscribe option 124 for N time period. In the example depicted in FIG. 3, the user may select the URL link for one of the unsubscribe options 302A-C. Selecting a URL link causes a notification to be sent to the subscription management system 102 for the selected unsubscribe option. In the example depicted in FIG. 5, the user may select one of the unsubscribe options 502A-C and submit using the submit button 504 to send a notification to the subscription management system 102 for the selected unsubscribe option.

At block 210, the process 200 involves changing, by the subscription management system 102, the active subscription of the user to a suppressed subscription for the selected N time period. The subscription management system 102 then moves the user from the active subscription list 114 to the suppressed subscription list 116. For example, if the user selected the unsubscribe for 12 months option 302B from FIG. 3 or the unsubscribe for 12 months option 502B from FIG. 5, N is 12 months. The subscription management system 102 then moves the user to the suppressed subscription list 116 along with an indication that subscription emails are to be suppressed for 12 months.

At block 212, the process 200 involves determining, by the subscription management system 102, an updated temporary unsubscribe period for the user before the temporary unsubscribe period N expires. In some examples, the subscription management system 102 determines the updated temporary unsubscribe period for the user when the current temporary unsubscribe period is close to expiring, such as when there is r time period left before the expiration. In some examples, the value of r depends on the length of the current temporary unsubscribe period. In one example, r is determined using a function such as r=N/10. Alternatively, certain temporary unsubscribe periods are mapped to certain r values. For example, for a temporary unsubscribe period of 6 months, r can be set to 2 weeks; for a temporary unsubscribe period of one month, r can be set to 3 days. In other examples, r is a set value, such as one week, regardless of the length of the current temporary unsubscribe period.

In some examples, the updated temporary unsubscribe period may be the same as the original temporary unsubscribe period. In other examples, the updated temporary unsubscribe period may be updated based on updated demographic data or activity data for the user, or based on improvements to the machine learning model. In one example, the subscription management system 102 determines multiple updated temporary unsubscribe periods that include a 1-month temporary unsubscribe period, a 4-month temporary unsubscribe period, and a 1-year temporary unsubscribe period.

At block 214, the process 200 involves embedding, by the subscription management system 102, updated unsubscribe options 124 in a reminder email 122 to the user. For example, the updated unsubscribe options 124 can include the 1 month unsubscribe period, the 4-month temporary unsubscribe period, and the 1-year temporary unsubscribe period. The updated unsubscribe options 124 can be embedded into the reminder email 122 using any of the methods discussed above. The user receives the reminder email 122 via the client device 118.

At block 216, the process 200 involves determining, by the subscription management system 102, if a new selection has been received. A new selection is received if the user selects a particular unsubscribe option 124 from the reminder email 122, such as by clicking a URL link associated with the particular unsubscribe option 124, or by selecting the particular unsubscribe option 124 on a personalized webpage generated from the reminder email 122. The selected unsubscribe option 124 corresponds to a temporary unsubscribe period of length N', such as for 1 year. If the new selection has been received, the process 200 continues to block 218. If the new selection has not been received, the process 200 continues to block 220.

At block 218, the process 200 involves extending, by the subscription management system 102, the unsubscribe period N by the newly selected N' value. For example, the user selects the updated unsubscribe option for one year, and therefore is put on the suppressed subscription list 116 for one more year. The process 200 continues to block 212. At block 220, the process 200 involves changing, by the subscription management system 102, the suppressed subscription to the active subscription for the user after N expires. This includes moving the user from the suppressed subscription list 116 to the active subscription list 114. The process 200 further continues to block 202 to generate updated unsubscribe options to be embedded in the subscription emails for the user.

Example of a Computing System for Implementing Certain Embodiments

Figure 7:
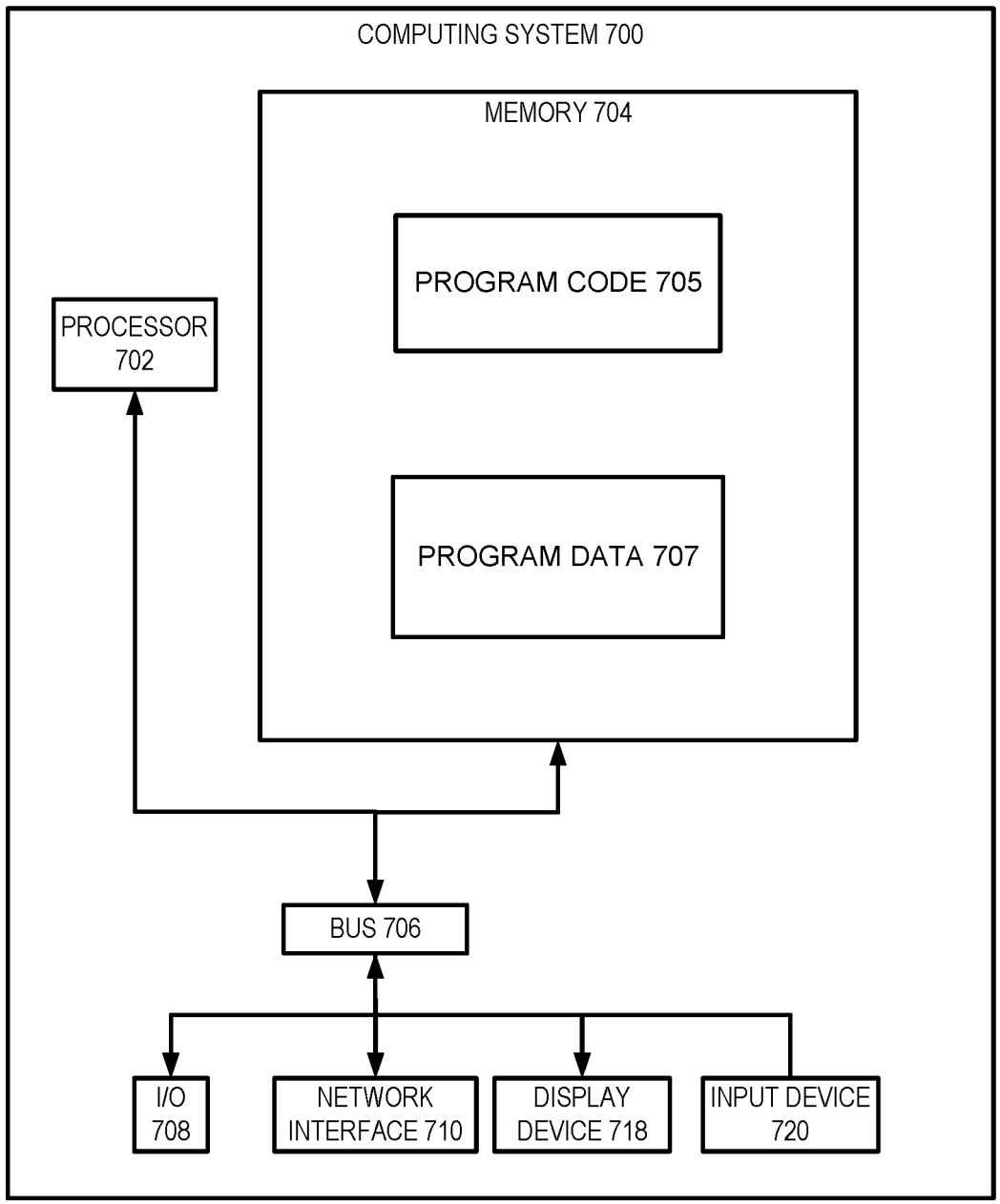
FIG. 7 depicts an example of a computing system for implementing certain embodiments of the present disclosure.

Any suitable computing system or group of computing systems can be used for performing the operations described herein. For example, FIG. 7 depicts an example of the computing system 700. The implementation of computing system 700 could be used for one or more of a client device 118A-C, a subscription management system 102, and a data repository 106. In other embodiments, a single computing system 700 having devices similar to those depicted in FIG. 7 (e.g., a processor, a memory, etc.) combines the one or more operations and data stores depicted as separate systems in FIG. 1.

The depicted example of a computing system 700 includes processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

A memory device 704 includes any suitable non-transitory computer-readable medium for storing program code 705, program data 707, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 700 executes program code 705 that configures the processor 702 to perform one or more of the operations described herein. Examples of the program code 705 include, in various embodiments, the subscription management module 104 by the subscription management system 102 or other suitable applications that perform one or more operations described herein (e.g., one or more development applications for configuring the client devices 118A-C or the data repository 106). The program code may be resident in the memory device 704 or any suitable computer-readable medium and may be executed by the processor 702 or any other suitable processor.

In some embodiments, one or more memory devices 704 stores program data 707 that includes one or more datasets and models described herein. Examples of these datasets include subscription data 110, user profiles 120, etc. In some embodiments, one or more of data sets, models, and functions are stored in the same memory device (e.g., one of the memory devices 704). In additional or alternative embodiments, one or more of the programs, data sets, models, and functions described herein are stored in different memory devices 704 accessible via a data network. One or more buses 706 are also included in the computing system 700. The buses 706 communicatively couples one or more components of a respective one of the computing system 700.

In some embodiments, the computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices (e.g., a computing device executing a subscription management system 102) via a data network using the network interface device 710.

The computing system 700 may also include a number of external or internal devices, an input device 720, a presentation device 718, or other input or output devices. For example, the computing system 700 is shown with one or more input/output ("I/O") interfaces 708. An I/O interface 708 can receive input from input devices or provide output to output devices. An input device 720 can include any device or group of devices suitable for receiving visual, auditory, or other suitable input that controls or affects the operations of the processor 702. Non-limiting examples of the input device 720 include a touchscreen, a mouse, a keyboard, a microphone, a separate mobile computing device, etc. A presentation device 718 can include any device or group of devices suitable for providing visual, auditory, or other suitable sensory output. Non-limiting examples of the presentation device 718 include a touchscreen, a monitor, a speaker, a separate mobile computing device, etc.

Although FIG. 7 depicts the input device 720 and the presentation device 718 as being local to the computing device that executes the subscription management system 102, other implementations are possible. For instance, in some embodiments, one or more of the input device 720 and the presentation device 718 can include a remote client-computing device that communicates with the computing system 700 via the network interface device 710 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
    accessing, by a subscription management system having a processor and a memory, information associated with an active email subscription by a user and a profile of the user;
    determining, by the subscription management system, a temporary unsubscribe time period for the user from the information associated with the active email subscription and the profile of the user;
    embedding, by the subscription management system, a temporary unsubscribe option in an email to be sent to the user, the temporary unsubscribe option representing the temporary unsubscribe time period;
    causing, by the subscription management system, the email to be sent to the user;
    receiving, by the subscription management system, a selection of the temporary unsubscribe option;
    suppressing, by the subscription management system, the active email subscription of the user for the temporary unsubscribe time period;
    prior to the temporary unsubscribe time period expires:
        determining, by the subscription management system, an updated temporary unsubscribe time period for the user based on the suppressed email subscription and the profile of the user;
        embedding, by the subscription management system, a second temporary unsubscribe option in a reminder email to be sent to the user, the second temporary unsubscribe option representing the updated temporary unsubscribe time period;
        causing the reminder email to be sent to the user;
        receiving a selection of the second temporary unsubscribe option; and
        extending the suppression of the active email subscription by the updated temporary unsubscribe time period.

2. The method of claim 1, wherein determining the temporary unsubscribe time period for the user comprises one or more of:

estimating the temporary unsubscribe time period according to a function of a set of factors; or
determining the temporary unsubscribe time period via a machine learning model using the set of factors as input.

3. The method of claim 2, wherein a training dataset for the machine learning model is generated based on selected unsubscribe time periods by a plurality of users from temporary unsubscribe time periods determined according to the function.

4. The method of claim 1, wherein embedding the temporary unsubscribe option in the email comprises:
embedding the temporary unsubscribe option in a body of the email; or
embedding the temporary unsubscribe option in a header of the email.

5. The method of claim 4, wherein embedding the temporary unsubscribe option in the header of the email comprises:
generating a Uniform Resource Locator (URL) link comprising information of the temporary unsubscribe option and an additional unsubscribe option; and
causing the URL link to be displayed along with sender information of the email in a user interface presenting the email to the user; and
wherein receiving the selection of the temporary unsubscribe time period comprises:
receiving an activation of the URL link;
generating a webpage presenting the temporary unsubscribe option and the additional unsubscribe option based on information of the temporary unsubscribe option and the additional unsubscribe option contained in the URL link; and
receiving the selection from at least the temporary unsubscribe option and the additional unsubscribe option from the webpage.

6. The method of claim 4, wherein embedding the temporary unsubscribe option in the body of the email comprises:
generating multiple Uniform Resource Locator (URL) links for the temporary unsubscribe option and an additional unsubscribe option; and
embedding the multiple URL links in the body of the email; and
wherein receiving the selection of the temporary unsubscribe option comprises receiving a selection among the multiple URL links in the email.

7. The method of claim 4, wherein embedding the temporary unsubscribe option in the body of the email comprises:
generating a Uniform Resource Locator (URL) link comprising information of the temporary unsubscribe option and an additional unsubscribe option; and
embedding the URL link in the body of the email; and
wherein receiving the selection of the temporary unsubscribe option comprises:
receiving an activation of the URL link;
generating a webpage presenting the temporary unsubscribe option and the additional unsubscribe option based on information of the temporary unsubscribe option and the additional unsubscribe option contained in the URL link; and
receiving the selection of the temporary unsubscribe option from the webpage.

8. A system comprising:
a data repository for storing data comprising active email subscriptions of users and user profiles; and
a processor executing a subscription management module, the subscription management module having access to the data stored in the data repository and configured to perform operations comprising:
determining a temporary unsubscribe time period for a user from information associated with an active email subscription and a profile of the user;
embedding a temporary unsubscribe option in an email to be sent to the user, the temporary unsubscribe option representing the temporary unsubscribe time period;
causing the email to be sent to the user;
receiving a selection of the temporary unsubscribe option;
suppressing the active email subscription of the user for the temporary unsubscribe time period;
prior to the temporary unsubscribe time period expires:
determining an updated temporary unsubscribe time period for the user based on the suppressed email subscription and the profile of the user;
embedding a second temporary unsubscribe option in a reminder email to be sent to the user, the second temporary unsubscribe option representing the updated temporary unsubscribe time period;
causing the reminder email to be sent to the user;
receiving a selection of the second temporary unsubscribe option; and
extending the suppression of the active email subscription by the updated temporary unsubscribe time period.

9. The system of claim 8, wherein determining the temporary unsubscribe time period for the user comprises one or more of:
estimating the temporary unsubscribe time period according to a function of a set of factors derived from the information associated with the active email subscription and the profile of the user; or
determining the temporary unsubscribe time period via a machine learning model using the set of factors as input.

10. The system of claim 9, wherein a training dataset for the machine learning model is generated based on selected unsubscribe time periods by a plurality of users from temporary unsubscribe time periods determined according to the function.

11. The system of claim 8, wherein embedding the temporary unsubscribe option in the email comprises:
embedding the temporary unsubscribe option in a body of the email; or
embedding the temporary unsubscribe option in a header of the email.

12. The system of claim 11, wherein embedding the temporary unsubscribe option in the header of the email comprises:
generating a Uniform Resource Locator (URL) link comprising information of the temporary unsubscribe option and an additional unsubscribe option; and
causing the URL link to be displayed along with sender information of the email in a user interface presenting the email to the user; and
wherein receiving the selection of the temporary unsubscribe time period comprises:
receiving an activation of the URL link;
generating a webpage presenting the temporary unsubscribe option and the additional unsubscribe option based on information of the temporary unsubscribe option and the additional unsubscribe option contained in the URL link; and receiving the selection from at least the temporary unsubscribe option and the additional unsubscribe option from the webpage.

13. The system of claim 11, wherein embedding the temporary unsubscribe option in the body of the email comprises:

generating multiple Uniform Resource Locator (URL) links for the temporary unsubscribe option and an additional unsubscribe option; and embedding the multiple URL links in the body of the email; and wherein receiving the selection of the temporary unsubscribe option comprises receiving a selection among the multiple URL links in the email.

14. The system of claim 11, wherein embedding the temporary unsubscribe option in the body of the email comprises:

generating a Uniform Resource Locator (URL) link comprising information of the temporary unsubscribe option and an additional unsubscribe option; and embedding the URL link in the body of the email; and wherein receiving the selection of the temporary unsubscribe option comprises:

receiving an activation of the URL link;

generating a webpage presenting the temporary unsubscribe option and the additional unsubscribe option based on information of the temporary unsubscribe option and the additional unsubscribe option contained in the URL link; and receiving the selection of the temporary unsubscribe option from the webpage.

15. A non-transitory computer-readable medium having program code that is stored thereon, the program code executable by one or more processing devices for performing operations comprising:

determining a temporary unsubscribe time period for a user from information associated with an active email subscription and a profile of the user;

embedding a temporary unsubscribe option in an email to be sent to the user, the temporary unsubscribe option representing the temporary unsubscribe time period;

causing the email to be sent to the user;

receiving a selection of the temporary unsubscribe option;

suppressing the active email subscription of the user for the temporary unsubscribe time period;

prior to the temporary unsubscribe time period expires:

determining an updated temporary unsubscribe time period for the user based on the suppressed email subscription and the profile of the user;

embedding a second temporary unsubscribe option in a reminder email to be sent to the user, the second temporary unsubscribe option representing the updated temporary unsubscribe time period;

causing the reminder email to be sent to the user;

receiving a selection of the second temporary unsubscribe option; and extending the suppression of the active email subscription by the updated temporary unsubscribe time period.

16. The non-transitory computer-readable medium of claim 15, wherein embedding the temporary unsubscribe option in the email comprises:

embedding the temporary unsubscribe option in a body of the email; or embedding the temporary unsubscribe option in a header of the email.

17. The non-transitory computer-readable medium of claim 16, wherein embedding the temporary unsubscribe option in the header of the email comprises:

generating a Uniform Resource Locator (URL) link comprising information of the temporary unsubscribe option and an additional unsubscribe option; and causing the URL link to be displayed along with sender information of the email in a user interface presenting the email to the user; and wherein receiving the selection of the temporary unsubscribe time period comprises:

receiving an activation of the URL link;

generating a webpage presenting the temporary unsubscribe option and the additional unsubscribe option based on information of the temporary unsubscribe option and the additional unsubscribe option contained in the URL link; and receiving the selection from at least the temporary unsubscribe option and the additional unsubscribe option from the webpage.

18. The non-transitory computer-readable medium of claim 16, wherein embedding the temporary unsubscribe option in the body of the email comprises:

generating multiple Uniform Resource Locator (URL) links for the temporary unsubscribe option and an additional unsubscribe option; and embedding the multiple URL links in the body of the email; and wherein receiving the selection of the temporary unsubscribe option comprises receiving a selection among the multiple URL links in the email.

19. The non-transitory computer-readable medium of claim 16, embedding the temporary unsubscribe option in the body of the email comprises:

generating a Uniform Resource Locator (URL) link comprising information of the temporary unsubscribe option and an additional unsubscribe option; and embedding the URL link in the body of the email; and wherein receiving the selection of the temporary unsubscribe option comprises:

receiving an activation of the URL link;

generating a webpage presenting the temporary unsubscribe option and the additional unsubscribe option based on information of the temporary unsubscribe option and the additional unsubscribe option contained in the URL link; and receiving the selection of the temporary unsubscribe option from the webpage.

20. The non-transitory computer-readable medium of claim 15, wherein determining the temporary unsubscribe time period for the user comprises one or more of:

estimating the temporary unsubscribe time period according to a function of a set of factors derived from the information associated with the active email subscription and the profile of the user; or determining the temporary unsubscribe time period via a machine learning model using the set of factors as input.

* * * * *